H. E. TOWLE & J. B. BENTON.
Passenger-Register.

No. 162,717. Patented April 27, 1875.

UNITED STATES PATENT OFFICE.

HAMILTON E. TOWLE AND JOHN B. BENTON, OF NEW YORK, N. Y.

IMPROVEMENT IN PASSENGER-REGISTERS.

Specification forming part of Letters Patent No. 162,717, dated April 27, 1875; application filed February 20, 1875.

*To all whom it may concern:*

Be it known that we, HAMILTON E. TOWLE and JOHN B. BENTON, both civil engineers, of New York city, New York, have jointly invented certain new and useful improvements in machinery for indicating or recording the number of passengers entering cars, and for other purposes of like nature, and of which the following is a full description, having reference to the accompanying drawings, in which—

Figure 1:
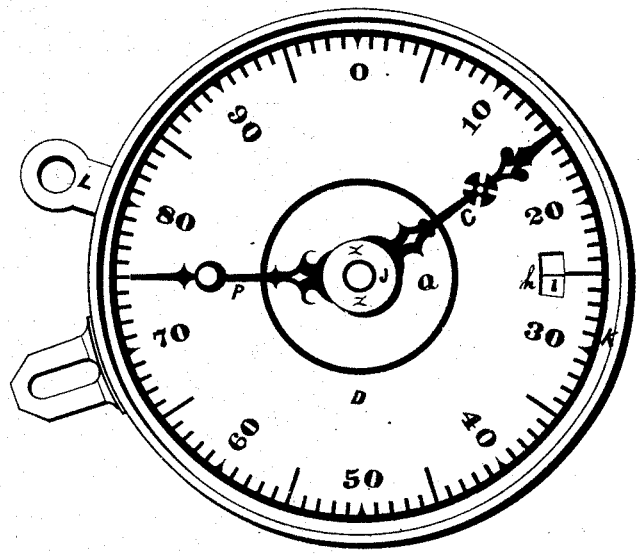
Figure 2:
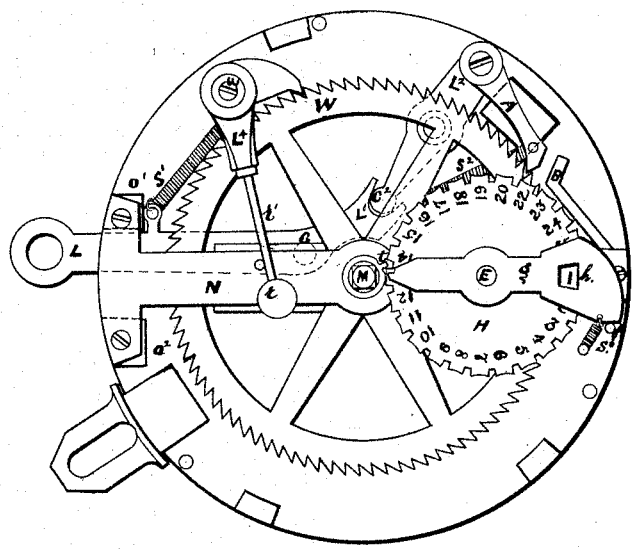

Figure 1 is front view of the machine, showing the dial D and the two index-fingers C and P, and the actuating-lever L, which must be pulled upon or moved every time a new indication is to be made. C is what we term the "trip-index," and P is the "permanent index," which, in conjunction with other parts, hereinafter described, show totals.

The dial, with all the working parts of the machine, is inclosed in the case K, having a glass face. The lever L projects through the case a short portion of its length, and to it a convenient strap or handle is attached to enable the operator to work the machine. The dial is divided into one hundred equal spaces, conveniently numbered, and is perforated in one or more places to allow an inspector to view numbers made upon movable dials or disks (one or more, depending on the capacity of the machine which works behind the dial D.) The movable dials are arranged to indicate the successive times that the index-finger P passes the century-point, and also the number of the times which they have completed full revolutions themselves, those parts comprising, in fact, a counting-machine, showing results similar to those in common use upon or in connection with steam-engines.

The object of our invention is to produce a machine which will, at all times, show upon its face two distinct things, namely: First, the total number of pulls the actuating-lever has received since the machine was first started with both index-fingers at zero; and, second, the number of pulls it has received since one of the hands was placed at zero, while, at the same time, the other index-finger with the movable dials continues to show the total number of pulls. Beside the indications above described, this machine is made to attract attention by striking a blow upon a bell, to give notice that a change in its indications has been, or is about to be, made.

Another object of this invention is to produce a machine which will indicate the number of passengers in a car by the corresponding number of actuating-pulls given to the lever on any trip or part of a trip, with such trip or partial trip indications distinctly made separately and apart from another indication of a total, which may comprise the pulls of several trips. To accomplish this result the trip-index C is secured by friction to, and is carried by, a central shaft, M, which is made to revolve through a one-hundredth of its revolution from and by each pull given upon the lever L till the trip is finished. Trip-index C may, either by the conductor himself or an inspector, be set back to zero, which also corresponds to the century, while the other index-finger P continually goes on and indicates, in conjunction with the other dials or indicators for hundreds, thousands, &c., the total number of pulls. This latter indicating arrangement is positive in its motion, and cannot be altered without removing the machine from its place, or exercising violence.

The permanent index P is fixed upon the main shaft M, which also carries the toothed wheel W, having a sufficient number of notches to make, in conjunction with its actuating-pawl A, one hundred stops to each revolution, corresponding to the marks on the dial D. The pawl is hinged to the end of lever $L^2$, and is held to its work by the spring $s^2$. $L^2$ is centered at $C^2$ and receives its motion from $L^1$, which is centered at $c$. Stops are placed at $O^1$ $O^2$ to limit the motion of the parts, and to prevent a sudden and excessive pull from causing the wheel W to move over more than one space, and thereby producing incorrect indications. A stop, B, is so placed that at the end of the movement due to one pull it causes the end of the pawl to jam itself in against the wheel W, and thus limit and stop the motion of the indicating-fingers; and at the proper point due to that particular pull, it will be seen that on relaxing any pull the main lever and attached parts are instantly drawn back in proper position to start again, by the action of a spring, $s^1$. To indicate the number of revolutions of the wheel W, and the attached permanent index P, which correspond to hundreds, a single pin or tooth is made to act upon a disk, H. H is centered upon the pin E in the cross-bar N. To avoid confusion and error in observing the numbers upon disk H, through the oblong hole $h$ in the dial D, during the engagement of the tooth, and while disk H is in motion, a cover or guard-plate, $g$, is also centered upon pin E, and so formed, at the end next to tooth $t$, that when that tooth actuates the disk H it also carries with it the guard-plate $g$ till the tooth escapes and allows the guard-plate suddenly to move over the last-expired figure of the dial, and at the same time to expose the one next in order. The guard-plate is perforated or slotted at the end over the numbers on the disks H, to provide for this exposure, and it is actuated by a weight acting by gravity or by a spring, $s^3$. The guard-plate is limited in its motion by the stud $f$, which acts as a stop to the motion induced by gravity on spring $s^3$. The trip index-finger C is carried by friction upon the central spindle M, and has a cap or hood attached to it, which protects the end of the shaft M from interference through the inspector's key-hole in the center of the glass plate over the dial, as shown at J. The inspector's key fits over this cap or hood with such accuracy as to prevent strain from coming from the key upon the edges of the hole in the glass plate while setting the trip-index C to the zero-point. This feature is shown in broken sectional view, Fig. 6. K K represent the case of the instrument; D D, the dial on which the numerals are arranged. P is the permanent hand, which revolves with the shaft M. C is the loose frictional hand, which revolves with the shaft M, and independently thereof by the key V. This hand C is connected to a small disk, $x\ x$. This disk is connected to a sleeve, $y$, which fits to the shaft M. J J represent a metallic flanged aperture, provided with flanges $z\ z$, which fit to both sides of the glass cover D′ D′. $a'\ a'$ represent a series of lugs or a flange, which supports the glass cover D′ D′. $a\ a$ represent the upper edge of the case K K as being bent or spun over for the purpose of holding the glass cover to its place. V is a key inserted into the aperture J and over the capped disk $x\ x$. $n'\ n'$ are two small projections on the end of the key V, which fit into corresponding recesses in the disk $x\ x$, whereby the hand C is turned, without the aid of the movement derived from the shaft M.

Fig. 7 represents the top plan of the disk $x\ x$. $n\ n$ are two small recesses leading from the sides of the aperture J. C is the frictional hand, and P the permanent hand. V represent a broken section of the key. The dotted lines $v'$ represent a hole or tube, and $n'\ n'$ two projections or lugs, which fit in the corresponding recesses $n\ n$ in the disk $x\ x$. The dial and sash are intended to be constructed with or permanently secured to the case containing the mechanism, and the case itself to be secured upon a support inaccessible without the proper key, so that neither the inspector nor the conductor can, by use of the inspector's key, or of pliers, effect the indication of totals. A bell, Q, is secured inside the case and is struck by hammer $r$, connected by rod $r'$ to the pawl or cam-lever $L^4$ moving upon the stud $u$. Cam-lever $L^4$ is actuated by the teeth of wheel W and the spring $s^4$, and gives one blow upon the bell at each pull.

What we claim, and desire to secure by Letters Patent, is—

1. In registering-machines, actuated by pulls given upon a lever, the combination of two index fingers, one of which is carried by friction, and may be freely adjusted to any point on the dial, and the other of which is permanently fixed to and moves only with the driving mechanism, arranged to operate substantially as described.

2. The actuating-lever L and lever $L^2$, pawl A, and ratchet-wheel W, in combination with the stop-lock B, adapted to receive the end thrust of the pawl at each movement of the actuating-lever, whereby the ratchet-wheel is securely locked.

3. A cover-plate, provided with suitable aperture, mounted upon the same shaft and combined with a register-disk, in combination with a register-wheel, the actuating-lug of which moves simultaneously the cover-plate and the disk, to keep the proper number upon its dial in view, and to keep, at the same time, the next consecutive number on the dial obscured until it is time for the indicator to change, and show said next number at the completion of a century, or at any other point of numeral division.

4. The disk $x$, carrying the index-hand C, in combination with the key V, inserted through the opening in the cover-plate.

The foregoing specification subscribed to by us this 24th day of December, 1874.

HAMILTON E. TOWLE.
    JOHN B. BENTON.

Witnesses:
 CHAS. H. LADD,
 WM. UNGER.